UNITED STATES PATENT OFFICE 2,497,812

PREPARATION OF PENTANEDIOL

Harry B. Copelin, Niagara Falls, N. Y., assignor to E. I. du Pont de Nemours & Company, Wilmington, Del., a corporation of Delaware No Drawing. Application November 14, 1946, Serial No. 709,793

5 Claims. (Cl. 260—635)

This invention relates to a novel process for the production of 1,5-pentanediol.

It is known that 1,5-pentanediol can be produced by the hydrolysis of dihydropyran in dilute acid and subsequent hydrogenation of the delta-hydroxyvaleraldehyde produced. However, yields of the desired product in accordance with prior art methods are low and the process is inefficient since a relatively large portion of the starting material is not converted to 1,5-pentanediol under the conditions utilized by the prior art. The process therefore has not been practical or economical for commercial operation.

It is an object of this invention to provide a new and improved process for the production of 1,5-pentanediol. Another object is to provide an efficient and practical process for the conversion of dihydropyran to 1,5-pentanediol. These and other objects will be apparent from the ensuing description of my invention.

The above objects are attained in accordance with my invention which comprises hydrogenating di-2-tetrahydropyryl ether in an aqueous medium in the presence of a hydrogenation catalyst.

The di-2-tetrahydropyryl ether which I utilize may be prepared by the hydrolysis of dihydropyran in the presence of dilute hydrochloric acid or other mineral acid. In the hydrolysis of dihydropyran two major products result and are present in varying proportions depending upon the particular conditions of hydrolysis. For example, when dihydropyran is hydrolyzed with an equal weight of dilute aqueous hydrochloric acid the product mixture may contain about 70% by weight of delta-hydroxy valeraldehyde and its isomer and about 30% by weight of di-2-tetrahydropyryl ether. When the molecular ratio of water to dihydropyran is reduced to less than 1 to 1 the proportion of di-2-tetrahydropyryl ether in the resulting mixture is increased.

If desired the di-2-tetrahydropyryl ether may be isolated from the mixture of hydrolysis products by distillation and then subjected to hydrogenation in accordance with my invention. However, it is unnecessary to isolate the ether compound since I have found that high yields of 1,5-pentanediol are obtained when a mixture obtained by hydrolysis of dihydropyran is hydrogenated under the conditions of my invention.

In a preferred mode of practicing my invention dihydropyran is hydrolyzed in dilute aqueous mineral acid, the reaction mixture is neutralized and then subjected to hydrogenation in the presence of a hydrogenation catalyst and at least one mole of water for each mole of di-2-tetrahydropyryl ether.

In the hydrogenation of di-2-tetrahydropyryl ether in accordance with my invention it is essential that water be present during hydrogenation as I have discovered that in the absence of water substantially no 1,5-pentanediol is obtained. At least 1 mole of water should be present for each mole of di-2-tetrahydropyryl ether. It is desirable although not essential that water be present in excess of the stoichiometric proportion. I prefer to utilize an excess of about 100 to 200% water over that theoretically required.

It is desirable to carry out the hydrogenation in a neutral reaction medium and I prefer to utilize an aqueous medium which is substantially neutral, i. e., pH 6 to 8 in order to obtain optimum results. I prefer to avoid a strongly acid medium because of the deleterious effect of the acid upon the hydrogenation catalyst. On the other hand strongly alkaline conditions are to be avoided since alkali tends to increase the formation of undesirable by-products. Thus, although the process may be operated successfully with certain catalysts, for example, palladium, under strongly acid or alkaline conditions no advantage is obtained thereby and for practical operation it is desirable to utilize a substantially neutral medium.

Although the temperature may be varied considerably with successful results and may vary with the activity of different hydrogenation catalysts I prefer to utilize a temperature within the range of 130 to 160° C. I have discovered that the utilization of a supported nickel catalyst and a temperature of about 130 to 160° C. results in excellent yields of 1,5-pentanediol.

Any of the well-known hydrogenation catalysts may be used as catalysts in the operation of my invention. For example, iron, nickel, cobalt, platinum, palladium, or other metal from the eighth group of the periodic table may be utilized. Other operative catalysts include copper, copper-aluminum, copper-silicon and nickel-silicon alloy catalysts. When utilizing these materials as catalysts temperatures above 160° C. may be required. I prefer to utilize a nickel catalyst since this catalyst consistently results in excellent yields of 1,5-pentanediol, is easily prepared in a highly active form and is economical to use.

The process of my invention is preferably carried out at elevated pressure and a pressure of about 1000 to 2000 pounds per square inch is preferred. When a highly active catalyst is utilized lower pressures may be utilized and in some cases operation at atmospheric pressure may be successful although in general reaction is so slow at atmospheric pressure as to be impractical for commercial operation. Extremely high pressures, for example 5,000 to 10,000 pounds per square inch may be used but have no advantage and, in general, merely add to the cost of operation.

The following examples are illustrative of my invention:

*Example 1*

Dihydropyran, 300 g., was added to 200 g. of .05 N hydrochloric acid and heated to reflux. The reaction was exothermic and required cooling. When the reaction was over, the solution was neutralized with sodium bicarbonate and charged to a bomb with 25 g. of 30% nickel-on-kieselguhr. The mixture was heated with shaking under a hydrogen pressure of 1000–1500 pounds per square inch. When no more hydrogen was absorbed at 150° C., the bomb was cooled, vented and emptied. The product was filtered and distilled. A 93 per cent yield of pure pentanediol was obtained.

*Example 2*

A bomb was charged with 100 g. of di-2-tetrahydropyryl ether, 10 g. of 30% nickel-on-kieselghur and 250 cc. of water. This material was heated under 1000 pounds of hydrogen pressure at 130–140° C. When absorption ceased, the bomb was cooled, vented and emptied. The product was filtered and distilled at 105 g. of pentanediol, a yield of 94% was obtained.

*Example 3*

A bomb was charged with 180 g. of di-2-tetrahydropyryl ether, 25 g. of 10% palladinized charcoal and 200 cc. of water. The mixture was hydrogenated at 140–160° C. at 1500 pounds pressure. Distillation of the product produced 183 g. of pentanediol, a yield of 90%.

The process of my invention provides a practical and economical means for the production of 1,5-pentanediol on any desired scale. The product is a useful compound in various organic syntheses.

I claim:
1. The process for the production of 1,5-pentanediol which comprises hydrogenating di-2-tetrahydropyryl ether in a substantially neutral aqueous medium in the presence of a hydrogenation catalyst.

2. The process for the production of 1,5-pentanediol which comprises hydrogenating di-2-tetrahydropyryl ether in a substantially neutral aqueous medium in the presence of a hydrogenation catalyst at a temperature of 130 to 160° C. and elevated pressure.

3. The process for the production of 1,5-pentanediol which comprises hydrogenating di-2-tetrahydropyryl ether in a substantially neutral aqueous medium in the presence of a nickel catalyst.

4. The process for the production of 1,5-pentanediol which comprises hydrolyzing dihydropyran in a dilute aqueous acid medium and reacting the hydrolysis product obtained thereby with water and hydrogen in a substantially neutral aqueous medium in the presence of a hydrogenation catalyst at a temperature of 130 to 160° C.

5. The process for the production of 1,5-pentanediol which comprises hydrolyzing dihydropyran in a dilute aqueous acid medium and reacting the hydrolysis product obtained thereby with water and hydrogen in a substantially neutral aqueous medium in the presence of a nickel catalyst at a temperature of 130 to 160° C.

HARRY B. COPELIN.

REFERENCES CITED

The following references are of record in the file of this patent:

UNITED STATES PATENTS

| Number | Name | Date |
|---|---|---|
| 2,097,493 | Leuck | Nov. 2, 1937 |
| 2,440,929 | Brenner | May 4, 1948 |

OTHER REFERENCES

Wilson, Journ. Chem. Soc. (London), page 53, 1945.

Schiepp et al., "J. A. C. S.," vol. 68 (1946), pages 1646–48.

Paul, "Bulletin Soc. Chim. de France," 5th Series, vol. 1, part 2 (1934) pages 971–980.